United States Patent
Bows et al.

(10) Patent No.: US 7,695,746 B2
(45) Date of Patent: Apr. 13, 2010

(54) PROCESS FOR MAKING A HEALTHY SNACK FOOD

(75) Inventors: John Richard Bows, Lutterworth (GB); Colin Jeffrey Burnham, Quom (GB); Jon Paul Coker, Rugby (GB); Greg Paul Hilliard, Coventry (GB); David Lester Hickie, Market Harborough (GB); Michelle Louise Lock, Bury St Edmunds (GB); Brian Richard Newberry, Leicestershire (GB)

(73) Assignee: Frito-Lay Trading Company GmbH, Geneva, Bern (CH)

( * ) Notice: Subject to any disclaimer, the term of this patent is extended or adjusted under 35 U.S.C. 154(b) by 884 days.

(21) Appl. No.: 11/458,592

(22) Filed: Jul. 19, 2006

(65) Prior Publication Data

US 2008/0026122 A1    Jan. 31, 2008

(51) Int. Cl.
*A23L 1/01* (2006.01)

(52) U.S. Cl. ................ 426/233; 426/243; 426/637; 426/465; 426/523

(58) Field of Classification Search .......... 426/231, 426/233, 241–243, 637, 438, 443, 465, 520–523
See application file for complete search history.

(56) References Cited

U.S. PATENT DOCUMENTS

| 2,091,372 | A |   | 8/1937  | Moore            |         |
|-----------|---|---|---------|------------------|---------|
| 2,110,184 | A |   | 3/1938  | Webb             |         |
| 3,355,299 | A |   | 11/1967 | McLaughlin et al.|         |
| 3,365,301 | A | * | 1/1968  | Lipoma et al.    | 426/242 |
| 3,650,973 | A |   | 3/1972  | Maeder et al.    |         |
| 4,073,952 | A |   | 2/1978  | Standing et al.  |         |
| 4,277,510 | A |   | 7/1981  | Wicklund et al.  |         |
| 4,283,425 | A |   | 8/1981  | Yuan et al.      |         |
| 4,471,195 | A |   | 9/1984  | Ishii et al.     |         |
| 4,488,027 | A |   | 12/1984 | Dudley et al.    |         |
| 4,608,262 | A |   | 8/1986  | Galland          |         |
| 4,664,924 | A |   | 5/1987  | Sugisawa et al.  |         |
| 4,714,813 | A |   | 12/1987 | Trenchard        |         |
| 4,721,625 | A |   | 1/1988  | Lee et al.       |         |
| 4,746,968 | A |   | 5/1988  | Wear et al.      |         |
| 4,756,916 | A | * | 7/1988  | Dreher et al.    | 426/302 |

(Continued)

FOREIGN PATENT DOCUMENTS

CA          1151945 A       8/1983

(Continued)

*Primary Examiner*—Drew E Becker
(74) *Attorney, Agent, or Firm*—Colin P. Cahoon; Chad E. Walter; Carstens & Cahoon, LLP

(57) ABSTRACT

The present invention is directed towards a method for making a healthy snack food having an appearance and taste similar to conventional fried snack products without the use of an oil-frying process. The method of the present invention includes the steps of providing food slices from a starch-based food or dough. The food slices can be blanched and a small amount of oil can be added to enhance final organoleptical properties. The food slices are then rapidly dehydrated to a much lower moisture content in a primary drying step. The dehydrated food slices can then be heated to impart fried flavor notes. A food snack, such as a corn or potato-based snack, produced by this method is a low-fat, ready-to-eat snack having the conventional texture and taste associated with fried snack products.

12 Claims, 5 Drawing Sheets

U.S. PATENT DOCUMENTS

| | | | |
|---|---|---|---|
| 4,800,090 A * | 1/1989 | August | 426/243 |
| 4,803,090 A | 2/1989 | Schlipalius et al. | |
| 4,873,093 A | 10/1989 | Fazzolare et al. | |
| 4,906,483 A | 3/1990 | Kloos | |
| 4,933,199 A | 6/1990 | Neel et al. | |
| 4,948,609 A | 8/1990 | Nafisi-Movaghar | |
| 4,950,492 A | 8/1990 | Shachat et al. | |
| 5,000,972 A | 3/1991 | Nafisi-Movaghar | |
| 5,180,601 A | 1/1993 | Gaon et al. | |
| 5,188,859 A | 2/1993 | Lodge et al. | |
| 5,202,139 A | 4/1993 | Gaon et al. | |
| 5,204,133 A | 4/1993 | Hibbs et al. | |
| 5,292,540 A | 3/1994 | Laufer | |
| 5,298,707 A * | 3/1994 | Sprecher et al. | 219/693 |
| 5,392,698 A | 2/1995 | Sprecher et al. | |
| 5,393,543 A | 2/1995 | Laufer | |
| 5,425,308 A | 6/1995 | Dickerson et al. | |
| 5,500,240 A | 3/1996 | Addesso et al. | |
| 5,560,287 A | 10/1996 | Petelle et al. | |
| 5,643,626 A * | 7/1997 | Henson et al. | 426/438 |
| 5,645,876 A | 7/1997 | Subramaniam et al. | |
| 5,676,989 A * | 10/1997 | Durance et al. | 426/242 |
| 5,690,982 A | 11/1997 | Fazzolare et al. | |
| 5,718,935 A * | 2/1998 | Laufer | 426/243 |
| 5,858,431 A * | 1/1999 | Wiedersatz | 426/242 |
| 5,902,510 A | 5/1999 | Balbaa et al. | |
| 5,956,865 A | 9/1999 | Durance et al. | |
| 5,961,870 A | 10/1999 | Hogan | |
| 5,962,057 A | 10/1999 | Durance et al. | |
| 5,972,397 A | 10/1999 | Durance et al. | |
| 6,025,580 A | 2/2000 | Yagi | |
| 6,104,015 A | 8/2000 | Jayan et al. | |
| 6,172,346 B1 | 1/2001 | Wroe | |
| 6,251,465 B1 | 6/2001 | Bello et al. | |
| 6,350,973 B2 | 2/2002 | Wroe et al. | |
| 6,546,646 B1 | 4/2003 | Thomas | |
| 6,572,910 B2 * | 6/2003 | Lanner et al. | 426/438 |
| 6,884,449 B2 | 4/2005 | Lee et al. | |
| 7,029,716 B2 | 4/2006 | Margolis | |
| 7,307,243 B2 * | 12/2007 | Farkas et al. | 219/388 |
| 2008/0026118 A1 * | 1/2008 | Bows et al. | 426/231 |
| 2008/0138480 A1 * | 6/2008 | Bows et al. | 426/465 |

FOREIGN PATENT DOCUMENTS

| | | |
|---|---|---|
| DE | 3233819 A1 | 3/1984 |
| WO | WO 92/21250 | 12/1992 |
| WO | WO 94/15481 | 7/1994 |
| WO | WO 03/103407 | 6/2002 |
| WO | 2004/047542 A1 | 6/2004 |

* cited by examiner

PROCESS FOR MAKING A HEALTHY SNACK FOOD

BACKGROUND OF THE INVENTION

1. Technical Field

The present invention relates to an improved method for producing shelf-stable snack foods and especially low oil snack foods. More specifically, the present invention relates to a method whereby a unique combination of unit operations are used to produce a low-fat potato crisp having organoleptical properties similar to those of traditional fried potato crisps.

2. Description of Related Art

Conventional potato crisp products are prepared by the basic steps of slicing peeled, raw potatoes, water washing the slices to remove surface starch, and frying the potato slices in hot oil until a moisture content of about 1-2% by weight is achieved. The fried slices can then be salted or seasoned and packaged.

Raw potato slices normally have a moisture content from about 75% to about 85% by weight depending on the type of potato and the environmental growing conditions. When potato slices are fried in hot oil, the moisture present boils. This results in burst cell walls and the formation of holes and voids which allow for oil absorption into the potato slices yielding oil contents ranging from about 30% to about 45% by weight.

The oil content of potato crisps is important for many reasons. Most important is its contribution to the overall organoleptic desirability of potato crisps, however, from the standpoint of good nutrition, it is desirable to maintain a low level of oil or fat in potato crisps. Many health conscious consumers desire a low fat alternative to the traditional fried crisp having minimal taste differences from the fried product.

Further, a high oil content renders the crisps greasy or oily and hence less desirable to the consumer. Numerous attempts have been made in the prior art to reduce the oil content in potato crisps. Many attempts involve thermally processing the potato slices in an oven or a microwave to avoid the addition of oil to the potato crisp.

For example, U.S. Pat. No. 5,292,540 claims a process for preparing potato crisps by first pre-baking the potato slices at a temperature of between about 121° C. to about 260° C. (250° F. to 500° F.) to remove about 50% to about 80% of the moisture in the slice prior to microwave heating the potato slices.

Similarly, U.S. Pat. Nos. 5,180,601; 5,202,139; and 5,298,707 all relate to a method and apparatus for producing fat-free snack crisps. For example, U.S. Pat. No. 5,298,707 discloses a first intensive microwave pre-baking step that reduces the moisture content in the potato to about 25% to about 30% by weight. The '707 patent employs a special intermittent microwave field provided by a meandering wave guide and a special conveyor belt to reduce the problems of hard surface and texture. However, according to U.S. Pat. No. 5,676,989, the approach disclosed in U.S. Pat. No. 5,298,707, still produces an undesirable, relatively dense, hard crisp. Similarly, nearly all of the prior art processes result in a low fat snack food having organoleptical properties far less desirable than the fried potato crisp counterpart. Thus, none of the prior art solutions have succeeded in mimicking the taste and texture of fried potato crisps.

Consequently, a need exists to provide an economical method for making reduced oil potato crisps having desirable organoleptical properties similar to traditional potato crisps.

BRIEF DESCRIPTION OF THE DRAWINGS

The novel features believed characteristic of the invention are set forth in the appended claims. The invention itself however, as well as a preferred mode of use, further objectives and advantages thereof, will be best understood by reference to the following detailed description of the illustrative embodiments when read in conjunction with the accompanying drawings wherein:

DETAILED DESCRIPTION

Figure 1:
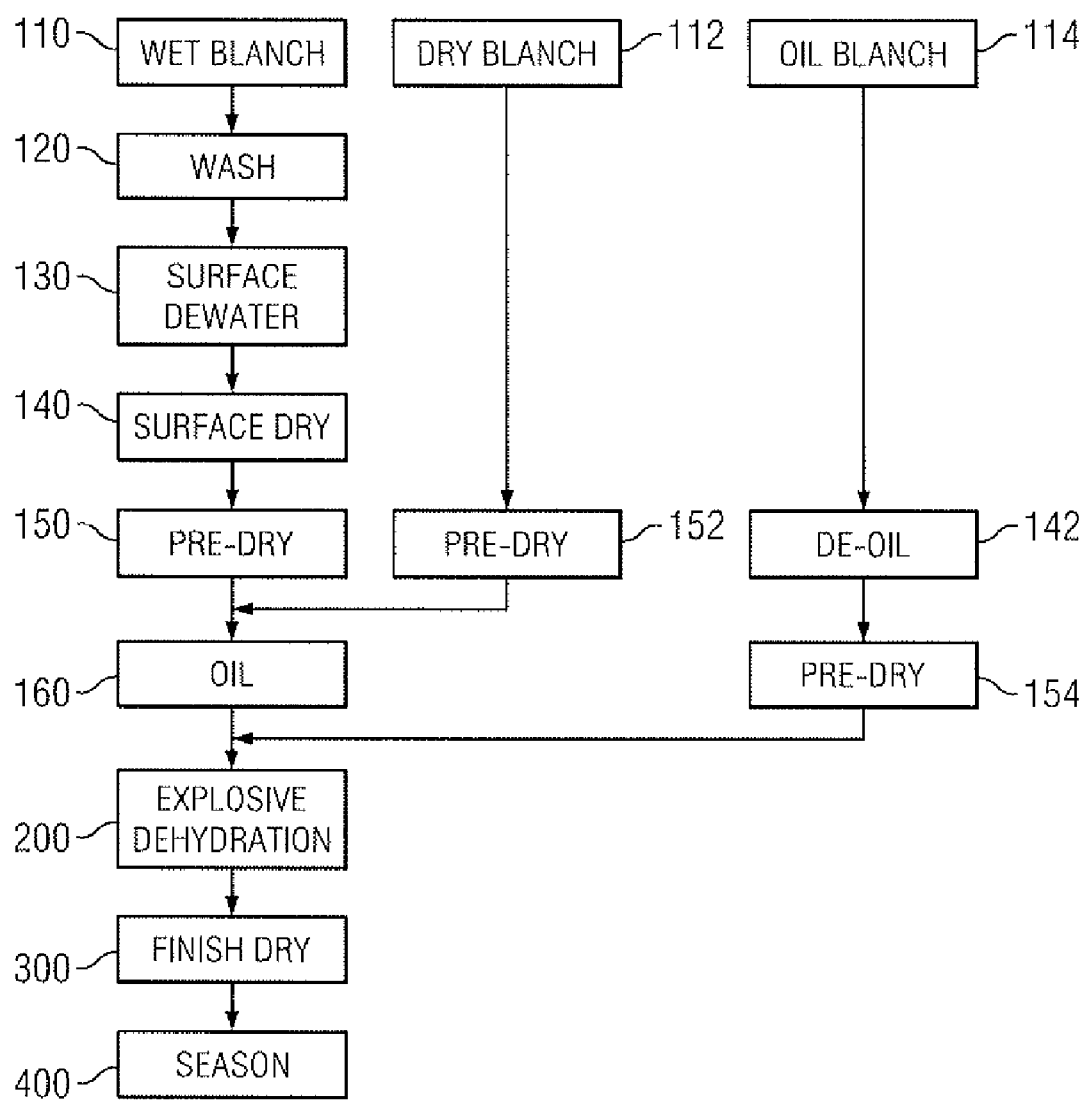
FIG. 1 is a flow chart representation depicting numerous embodiments of the present invention.

FIG. 1 is a flow chart representation depicting the preparation steps of raw food-based slices in accordance with numerous embodiments of the present invention. The preferred sources of food substrates or slices are cereal grains (e.g., corn, waxy corn, oats, wheat, sorghum, rice, and waxy rice), pulses (e.g. kidney beans, pinto beans, lentils, chickpea), tubers (i.e., potato, Jerusalem artichoke, yam), fruit, vegetables, and roots (i.e., tapioca, yucca, tarot, sweet potato, beet, carrot, arrowroot, cassava, parsnip). In one embodiment of the present invention, potatoes of the chipping variety can be used. Potatoes of the chipping variety that can be used include, but are not limited to Saturna, Lady Rosetta, Lady Clair, Hermes, Maris Piper, Erntestolz, Agria, Atlantic, Monona, Norchip, Snowden, Kennebec, Oneida, and Tobique. Non-chipping potato varieties can also be used including, but not limited to Marfona, King Edward, Yukon Gold, Desiree, Karlena and Estima. Similarly, French fry varieties such as Russet Burbank, and Bintje can be used. It should be noted that while chipping potatoes typically used for making potato crisps have relatively low levels of reducing sugars, and are not typically used to make French fries or baked potatoes, any potato can be used in accordance with the present invention and the present invention is not limited by physiological or biological make up of the potato.

Although potato slices are used to illustrate this invention, one skilled in the art armed with the knowledge of this disclosure will recognize that the resultant processing times and temperatures disclosed below may need to be adjusted to compensate for the use of a different starting material. For example, while the present invention is suitable for the preparation of low-fat potato crisps made from potatoes, the present invention is also applicable to a wide variety of food substrates which can be cut or otherwise formed into flat, generally thin slice-shaped portions. The present invention can be used to prepare crisps from raw vegetables, such as potatoes, and the like that have been cut into slices or, alternatively, doughs comprising masa, other raw materials reduced to a formable state, re-hydrated dry ingredients including potato flakes, or other food substrates may be ground into a dough or paste, mixed with other ingredients and additives and then shaped into configurations such as flat slice shapes for preparation into a snack. Consequently, as used herein, the term "food slice" encompasses pre-forms made from a dough.

Similarly, while the present invention is suitable for the preparation of low-fat potato crisps made from sliced potatoes, the resultant processing times and temperatures disclosed below may need to be adjusted to compensate for the use of a different starting material and shape. For example, potatoes can be cut into slices having one or more flat sides or the potatoes can be sliced with one or both ridged sides. One advantage of ridged sliced potatoes is that the slices are less likely to stick together because of the reduced surface tension which results from a reduced surface area available for contact between the slices. Consequently, less intensive surface drying may be required with a ridged slice. In one embodiment, the potatoes can be cut into wedges or French fry-like sticks of suitable size. In one embodiment, French-fry like sticks have cross-sectional widths of about 5 to about 6 millimeters. In another embodiment, potatoes are cut into slabs of, for example, about 1 to about 3 mm depth, about 50 to about 100 mm length and about 20 to about 50 mm width or other suitable size known in the art. Because the French-fry like sticks, wedges, and slabs have different geometries, surface area to volume ratios, etc. than slices, the processing times and energies disclosed in each unit operation below may require adjustments. Similarly, if the starting material is further reduced in size (for example by comminution through grating, shredding, ricing, milling or grinding) and then reformed to a dough, pellet, cluster, laminated snack or snack cake comprising the original material and, optionally, a medley of additional ingredients, the resulting food slice can be processed to a desirable snack product under appropriate conditions using the knowledge of this disclosure. Methods for preparing various pre-forms are known in the prior art as exemplified by U.S. Patent Application Publication No. US 2005/0202142, which discloses a method for making a clustered snack product or U.S. Patent Application Publication No. 2002/0142085, which discloses a method for making a potato mash.

In one embodiment, saturna or other suitable potatoes are washed and peeled prior to the slicing step. Although peeling is optional, the peel can contribute to a dominant earthy flavor when the finished food product has low oil content. In one embodiment, the potatoes are sliced to a thickness of between about 1.0 millimeters to about 2.5 millimeters (0.040 inches and about 0.1 inches) in a slicer to provide a plurality of potato slices. Other suitable slice thicknesses may be selected. The potatoes can be dry sliced, sliced in the presence of water, sliced in oil which may provide a desired oil addition to the slice and/or accomplish an oil blanching step. In one embodiment, potato slices are washed in a flume and dewatering belt to remove surface starch, scraps and excess oil, if applied, from the potato slices.

The potato slices are then blanched. If a dough is used, the blanching step may have already occurred at a prior processing stage and additional blanching may not be necessary. If the blanching occurred in a prior processing stage, then the blanching step should be construed to have occurred within the meaning of claimed limitations of the present invention. Further, in a dough-based embodiment, any blanching step is optional. Blanching is only a requirement where the product can benefit from pre-cooking the native starch or de-activating enzymes. Blanching is not necessary for leaching sugars or where native starch is already hydrated or when enzymes have been deactivated in a prior processing step. For example, in one embodiment, steam cooked vegetables such as carrots can be used as the food slice and no further blanching step is necessary. The purpose of the blanching step is to deactivate enzymes such as peroxidase, polyphenol oxidase, and lipoxygenase that can cause undesirable "earthy green" flavors. In one embodiment, blanching can also hydrate the native starch of the food slice. Blanching can be accomplished in a number of ways, including a wet blanch 110, a dry blanch 112 or an oil blanch 114. The blanching medium temperature and dwell time can vary based upon the shape and cross section of the food slice and are preferably such that the potato slices are sufficiently cooked to deliver a clean base flavor, absent of any raw, green taste.

In one embodiment, the slices are dry blanched 112 at a slice temperature of about 90° C. to about 95° C. for about 10 to about 120 seconds and more preferably for about 90 to about 100 seconds by a rotary or conveyor infrared dryer or other suitable heating medium. In one embodiment, dry blanching 112 is performed with microwaves or comprises irradiation. Dry blanching 112 of other shapes such as French fry like sticks can require blanching of two to four minutes and selection of appropriate infra-red wavelength for adequate penetration of the food slice. After dry blanching 112, the food slices can optionally be pre-dried 152 in a forced air oven to remove some initial water to improve overall process efficiency. The dry blanched 112 slices can then be routed to the oiling step 160, discussed below.

In one embodiment, the slices are oil blanched 114 by placing the slices into a warm oil flume or shallow continuous fryer. A HEATWAVE frying system available from Heat and Control of Hayward, Calif. USA can be used. In one embodiment, the slices are blanched at a slice temperature of about 90° C. to about 95° C. for about 90 to about 100 seconds for optimal slice rigidity and subsequent handling.

In one embodiment, the slices are oil blanched 114 by flash frying for a suitable time and temperature to deactivate enzymes. For example, in one embodiment, potato slices are flashed fried for about 7 seconds to about 10 seconds in oil at about 180° C. Alternatively, the potato slices can be flashed fried for about 15 to about 20 seconds in oil having a temperature of about 150° C. to about 160° C. These conditions may be preferred for thicker food slices to ensure adequate heat transfer and slice rigidity for subsequent handling.

Oil blanching 114 can result in some moisture loss from the slices. In one embodiment, about 3% to about 6% of the moisture is lost in the oil blanching step 114. More moisture can be lost if the oil blanching step 114 comprises flash frying. For example, in one embodiment, flash fried slices comprise a moisture content of about 50% to about 55% by weight. Consequently, in one embodiment, about 30% to about 40% of the starting weight of moisture in a potato can be lost in an oil blanching step 114 which can improve overall process efficiencies. One benefit of oil blanching is to simultaneously deactivate enzymes, add a limited amount of oil to the food slice and optionally pre-dry the substrate in one step. The potato slice is preferably kept above about 60° C. and preferably above about 90° C. between the oil blanching step 114 and any de-oiling step 142.

The slice can then be de-oiled 142 to the desired level. Because the oil is principally on the slice surface and has not been substantially absorbed into the slice interior, sufficient de-oiling 142 can be achieved on a drain belt. Alternatively, sufficient de-oiling 142 can be achieved by blowing warm or hot air, low pressure steam or superheated steam onto the slices for about 15 to about 30 seconds as the slices are conveyed on a drain belt. In one embodiment, centrifugal de-oiling can be used to lower the oil content in the de-oiling step 142 to the desired level. In one embodiment, the de-oiling step 142 can occur in a hot water (typically about 50° C.

to about 65° C.) or cold water (typically about 15° C. to about 25° C.) wash either of which optionally may contain marinade ingredients.

The de-oiling step 142 can be used to dial in and control the desired oil content. In one embodiment, the food slices are de-oiled such that the finished, dried food product comprises an oil content of less than about 10% by weight. However, less intense de-oiling can deliver higher oil levels in a controlled manner and in one embodiment, the food slices are de-oiled to an oil content of up to about 15% by weight of finished crisp or de-oiling is bypassed to deliver a slice having about 17% to about 25% oil by weight of the finished crisp. Consequently, one advantage of the oil blanching step 114 is the ability to control the oil levels in a food slice through a combination of the blanching and the de-oiling conditions.

Directly after oil blanching 114 or after de-oiling 142 the food slices can be optionally pre-dried 154 in a forced hot air oven at an air temperature of about 120° C. to about 140° C. for about 30 to about 60 seconds to remove some initial water to improve overall process efficiency and improve the ease of handling of the food slice in subsequent unit operations if required. The oil blanched 114 slices are preferably maintained above about 60° C. and more preferably above about 80° C. and more preferably between about 90° C. and about 98° C. when being transported to the explosive dehydration step 200.

In an alternative embodiment, the potato slices can be wet blanched 110 in water or steam at about 80° C. to about 100° C. for between about 50 seconds and about 3 minutes depending on the heat transfer required by the food slice dimensions. For example, a potato stick (French fry shape) food slice typically requires 3 minutes at about 80° C. to about 90° C. whereas a thin potato slice or slab typically requires about 90 seconds at about 80° C. to about 90° C.

Optionally, after wet blanching 110, the potato slices are then washed 120 in a water wash to further reduce gelatinized surface starch. The washing step may use hot water (typically about 50° C. to about 65° C.) to improve starch solubilisation. In one embodiment, the washing step 120 continuously uses cold water (typically about 15° C. to about 25° C.) that quenches the blanching process and improves the crispness of the final product texture. Either wash may optionally contain marinade ingredients. Removal of excess gelatinized surface starch will lessen the tendency of the potato slices to stick or clump together in later drying steps. A model No. PSSW-MCB speed washer available from Heat and Control, Inc., of Hayward, Calif. USA can be used to remove the surface starch with hot or cold water. In one embodiment, a cold water wash 120 of about 15° C. to about 20° C. containing from about 0.5% up to about 4% salt in solution can be used. One advantage of salt marinade is to facilitate the primary, explosive drying step 200 in a microwave. Alternatively, in one embodiment, a hot water wash 120 can help to solubilize excess starch gelatinized by blanching a high-starch food or specific potato varieties noted to release significant amounts of free starch (e.g. Atlantic) to aid in subsequent processing.

Optionally, during, prior to, or after any blanching step 110 112 114, the food slices can be marinated meaning that they are exposed to a solution having one or more dissolved compounds to improve the coupling efficiency of the microwave step or modify the final product attributes. Consequently, in one embodiment, the marinade comprises one or more ingredients selected from protective and anti-oxidant ingredients such as sodium sulphite or bisulphate, ascorbic acid (water soluble) or tocopherols (oil soluble); color enhancers such as beta-carotene, and annatto; pH modifiers such as citric or acetic acids; ionic salts such as potassium, sodium or calcium chlorides; enzymes such as glucose oxidase, laccase, lipase, pentosanase, transglutaminase, asparaginase, cellulase or amylase; carbohydrate sugars such as glucose, fructose, maltose, trehalose, and maillard reaction ingredients or long chain carbohydrates such as carageenan, arabic or guar gums, carboxymehyl cellulose, hydroxypropyl cellulose, native or modified starches. Because the objective of the blanching step 110 112 114 is to deactivate enzymes rather than reduce the potato slice glucose content, as in classic potato crisp frying, it can be beneficial for the blanching medium to be fully saturated either by added marinade ingredients or by the starches solubilised from the food slice itself so that no further inherent flavor compounds are solubilised and lost which can lead to a bland flavor in the final crisp.

The blanching, marinade, or washing system can be configured so that slices exit in a way that maximizes separation between slices and minimizes overlap on the next transport section of the process line. A speed wash, available from Heat and Control of Haywood, Calif., USA, is an example of suitable equipment to achieve this in a way that will improve the ease of processing in latter unit operations.

The potato slices can then optionally be dewatered 130 to remove surface water and reduce surface tension between slices to prevent clumping in later drying steps by contact with hot or cold air knives for about 2 to about 3 seconds. In one embodiment, the dewatering step reduces the free water (e.g. unbound water outside the potato slice picked up in the washing or blanching stages) from about 20% by weight to about 7 to about 10% by weight.

Surface moisture can be removed using an air sweep-type dryer that employs air knives. In one embodiment, air knives comprise heated or unheated (ambient) jets of air that are directed above the washed potato slice while vacuum suction carries away the dislodged moisture. In one embodiment, low pressure air (e.g. about 1.0 to about 1.4 bar) having a temperature of between about ambient and about 120° C. and a flow speed of between about 12 and about 16 meters per second can be used for sufficient time to remove the free surface water. In one embodiment, a multi-pass air knife, longitudinal air tunnel, or Turbo Air Sweep as manufactured by Heat and Control can be used.

In one embodiment, the surface moisture is substantially removed in a surface drying step 140 to prevent sticking and clumping in later unit operations and delivers the slices evenly distributed across a belt which is sufficiently wide and fast enough to ensure even coverage with minimal overlap. While monolayered slices may be considered the ideal process condition and has been cited as a necessary arrangement step in prior art applications (e.g. U.S. Pat. No. 5,298,707), it is important to appreciate that monolayering is not required for this invention and sliced food will be converted into individual finished crisps at the end of the process. Therefore, partial overlap of at least two slices is acceptable, which significantly simplifies the production process, reduces footprint and improves overall economics. Consequently, in one embodiment, transport, oiling or drying belt coverage comprises a partial overlap of two or more slices and may use a perforated belt constructed from metal links, which may optionally have a non-stick coating or use a polymer belt such as polypropylene, polyester or polytetrafluoroethylene (PTFE), which may optionally be tessellated to further reduce surface area contact and incidence of product adhesion to the transport belt.

In one embodiment, for those substrates where subsequent handling requires a very dry surface, surface water removal can be further enhanced by routing the potato slices from air knives to an air impingement or air jet impingement oven for between about 30 to about 180 seconds or more preferably from about 60 to about 120 seconds in air having a temperature of between about 60° C. to about 160° C. or more preferably about 120° C. to about 140° C. The time/temperature combination should be selected to dry the slice surface as fast as possible at the highest temperature that avoids excessive gelatinisation of any surface starch. Air flows may typically range from about 1 to about 3 m/sec and should be sufficient to contact as much surface area of all sides of the food slice as possible without excessive lifting or displacement from the transport belt, which may cause tearing, damage or loss of control of the food slice. If required, a hold-down belt can be used above the food slices to control agitation. An AIR-FORCE Impingement Oven available from Heat and Control, Inc. of Hayward, Calif., USA can be used. The objective is to remove as much of the surface moisture as possible and to try to achieve a surface moisture as close to about 0% as possible to minimize surface tension effects and optimize handling characteristics in later unit operations. This amount of surface moisture removal however may not be necessary for all food slice substrates or even all potato varieties. As used herein, about 0% surface moisture is defined such that if absorbent paper is applied to the food slice no water is absorbed by the paper. The removal of sufficient surface moisture has occurred when the overall moisture content of the potato slices has reached or is lower than the native water content e.g., the water content after slicing or prior to a blanching step. In one embodiment, the surface drying step 140 reduces the free water from about 7% to about 10% by weight to less than about 2% by weight and preferably to about 0% by weight.

Figure 2:
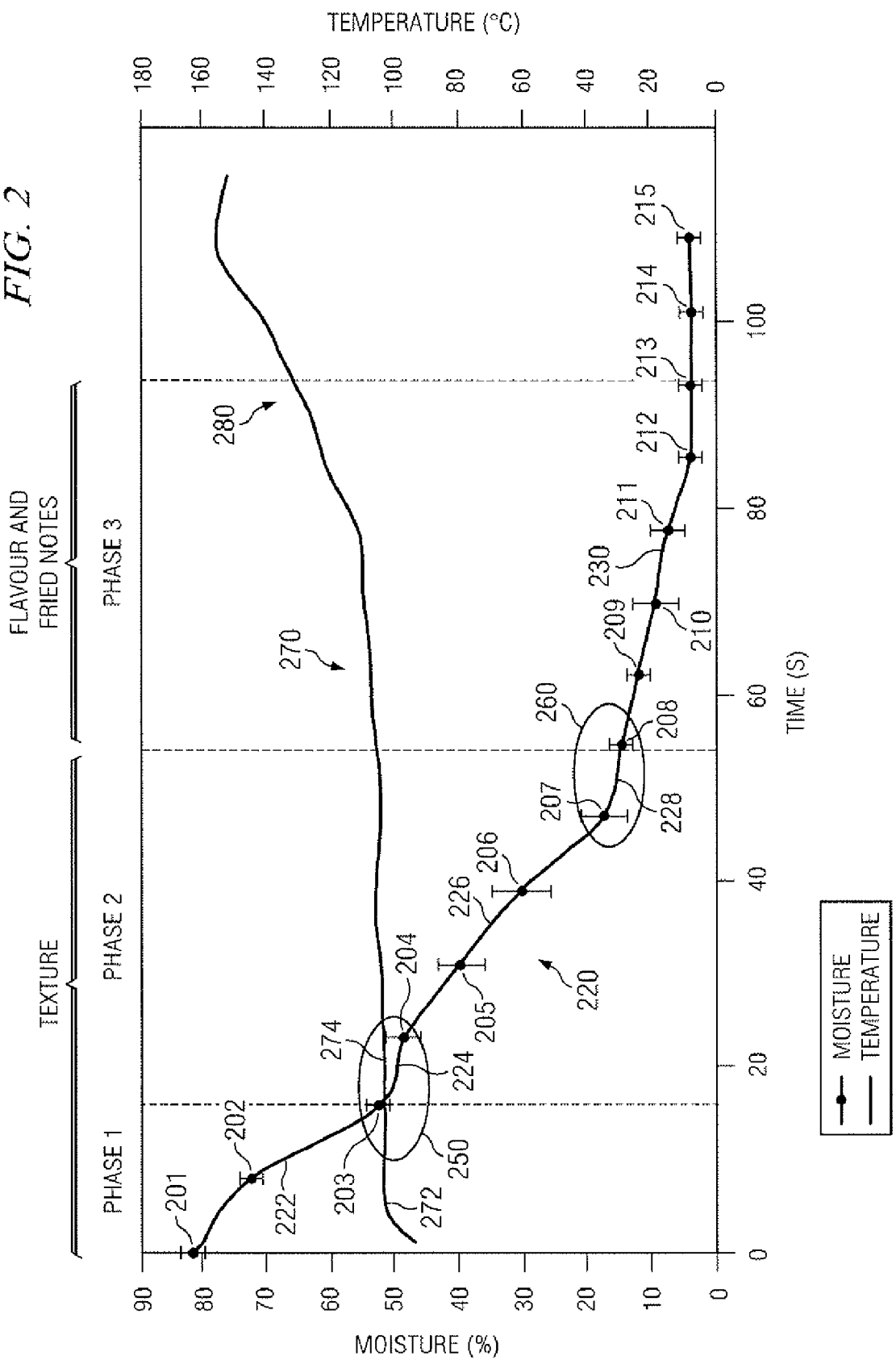
FIG. 2 is a graphical representation of the dehydration and temperature profile of a plurality of potato slices undergoing an explosive dehydration step in accordance with one embodiment of the present invention.

In one embodiment, the potato slices are further dried in a pre-drying step 150 which may be treated as a continuation of the surface drying step with the aim of improving the overall energy efficiencies of the drying process. A hot air conveyor dryer, commercially available from Aeroglide of Raleigh, N.C., USA, or a hot air rotary dryer (often used in the food industry for rice and seeds) can be used to reduce the moisture content by up to half of the native, raw material starting moisture content. The lowest moisture content exiting the pre-drying step 150 can be set as the point at which all 'unbound' moisture has been removed from the food slice. This coincides with the end of phase 1 (as shown in FIG. 2, discussed below) in the explosive dehydration step 200 for the food slice being dehydrated. In one embodiment, potato slices leaving the pre-drying step 150 comprise a moisture content of between about 50% by weight and its native moisture content (typically about 80% for a potato slice) and more preferably between about 65% and about 75% by weight. Drying conditions should preferably be maintained at air temperatures of about 110° C. to about 140° C. for about 60 seconds to about 120 seconds. The pre-drying step 150 can improve the mechanical strength of the slice and help reduce excessive deformation in the microwave and prevent the potato slice from balling up during the explosive dehydration step 200.

The potato slices can then be coated with oil in an oil coating step 160 to a controlled level as required in the final product. Oil is important to the development and finished texture, flavor and mouth feel of the potato crisps. A thin coating of oil, preferably applied in droplet form, can help control the number and size of blisters that are formed when the potato slice is explosively dehydrated 200 in the primary dryer.

The amount of oil imparted by the coating step 160 can be controlled to obtain desired nutritional and organoleptical properties. Any oil or fat is suitable for the process disclosed including vegetable oil, animal fats or synthetic oils, for example coconut oil, corn oil, cottonseed oil, palm oil, palm olein, linseed oil, safflower oil, high oleic safflower oil, palm stearin, soybean oil, sunflower oil, mid or high oleic sunflower oil, rape seed oil, lard, tallow, fish oils, olestra, sucrose polyesters, medium chain fatty acids, diacyl glycerols, or a blend of different oils. The choice of oil can be used to influence the final flavor and mouth feel of the finished crisp as well as the nutrition profile.

In one embodiment, the amount of oil added 160 is such that the oil content of the finished dried potato slice is less than about 10% by weight and more preferably between about 6% and about 8% by weight. In an alternative embodiment, oil is added to achieve an oil content of less than about 25% by finished crisp weight and more preferably about 14% to about 17% so that the finished oil content is less than half that of regular crisps today.

In one embodiment, oil is added 160 to the potato slices by a rotary oiler comprising spray nozzles mounted on an oil lance placed in a rotary drum. The application rate of the oil may be controlled by a simple drum pump and may be measured with a flow meter if desired. For increased accuracy, the flow meter can be calibrated to a mass weighbelt, vibro weighbelt or similar device on the infeed or outfeed of the drum. A rotary drum design similar to those used to season snack foods can be used. In one embodiment, the potato slices are in the rotary oiler for between about 10 to about 30 seconds tumbling at about 10 to about 30 rpm. The rpm should be set to maintain sufficient slice separation for coating however, the exact values will depend on the drum dimensions selected for the quantity of slices to be oiled. Preferably, the drum is made from or coated with an anti-sticking material such as polyctrafluoroethylene (PTFE) or a fluoropolymer to minimize product sticking to the drum walls. In one embodiment, a perforated or scored pattern can be placed along the drum interior. In one embodiment, the drum interior comprises a longitudinal flight to assist the tumbling action and segregation of the food slices. A longitudinal flight or Archimedes screw can also be used to control dwell time inside the drum. One advantage of a rotary oiler is that the oil can be added to potato slices without the need to monolayer.

In one embodiment, the coating step 160 comprises a monolayer oil spray or alternatively a bakery oiler comprising a spinning plate or a vertical oil curtain can be used for products which are suited to or have been monolayered. In one embodiment, the coating step 160 comprises marinating the potato slices in oil at ambient temperatures or blanching or flash frying in oil at higher temperatures as described above. In one embodiment, the pre-drying step 150 and oil coating step 160 occurs in the same rotary device. In one embodiment, oil addition 160 occurs during the explosive dehydration step 200.

The addition of oil 160 to the food slice produces several advantages. For example, oil can be used to control the formation of blisters so that many small blisters form where otherwise large bubble blisters may occur. This is particularly true at lower drying rates (longer drying times) when steam is generated less rapidly. At higher drying rates, the explosive dehydration has a similar result by a different mechanism since a porous structure is created by escaping steam to relieve internal pressure. Second, oil is heated in the microwave particularly when moisture contents are low as in phase 3 of the drying curve described later. The heating initiates a chemical-food reaction in the oil which develops fried flavor notes. A similar effect can be achieved if the oil is "conditioned" by heating off line, either using conventional heating methods, microwave energy or otherwise and then applied via a spray onto the product. However, if oil is applied to the product prior to microwaving, the oil confers the additional advantage of acting as an energy or heat sink towards the end of the drying cycle when the moisture content is low. This is evidenced by experiments conducted by the inventors that reveal higher exit temperatures for a given time or moisture content of products which have been oiled prior to microwave drying verses non-oiled products. Consequently, adding oil prior to the explosive dehydration step 200 reduces the incidence of scorching in the microwave and drying can therefore continue to lower final moisture contents without generating undesirable burnt notes in the potato crisp or snack.

The potato slices are then routed to a microwave for the explosive dehydration 200 step. To improve process control and enable more accurate drying at high rates, potato slices may be routed via a mass feed weighbelt. A similar advantage is obtained for food slices originating from doughs by forming and depositing in pieces of controlled volume or mass. As used herein the terms, "explosive drying," "explosive dehydration," "rapidly dehydrated" and "primary drying" are synonymous and are defined as simulating a dehydration profile corresponding to a fried food product that occurs in a non-oil medium. The non-oil heating medium can include but is not limited to, microwave radiation, infrared radiation, radio frequency radiation, superheated steam and combinations thereof. The primary energy source applied for evaporation of water by non-oil heating may be supplemented with additional heat sources or energy sources such as hot air, steam, superheated steam, microwave, infrared or radio frequency radiation. Commercial production of potato crisps typically involves a continuous process wherein sliced potatoes are continuously introduced into a vat of frying oil at a temperature of about 365° F. (about 185° C.), conveyed through the oil by paddles or other means, and removed from the oil after about two and one-half to three minutes of frying by an endless conveyor belt when the moisture content of the crisps has been reduced to about 2% or less by weight of fried chip (equivalent to 2.7% or less of finished chip potato weight). The resulting product generally has texture and flavor characteristics which are usually recognizable by consumers as typical commercially produced continuous process potato crisps.

Figure 4:
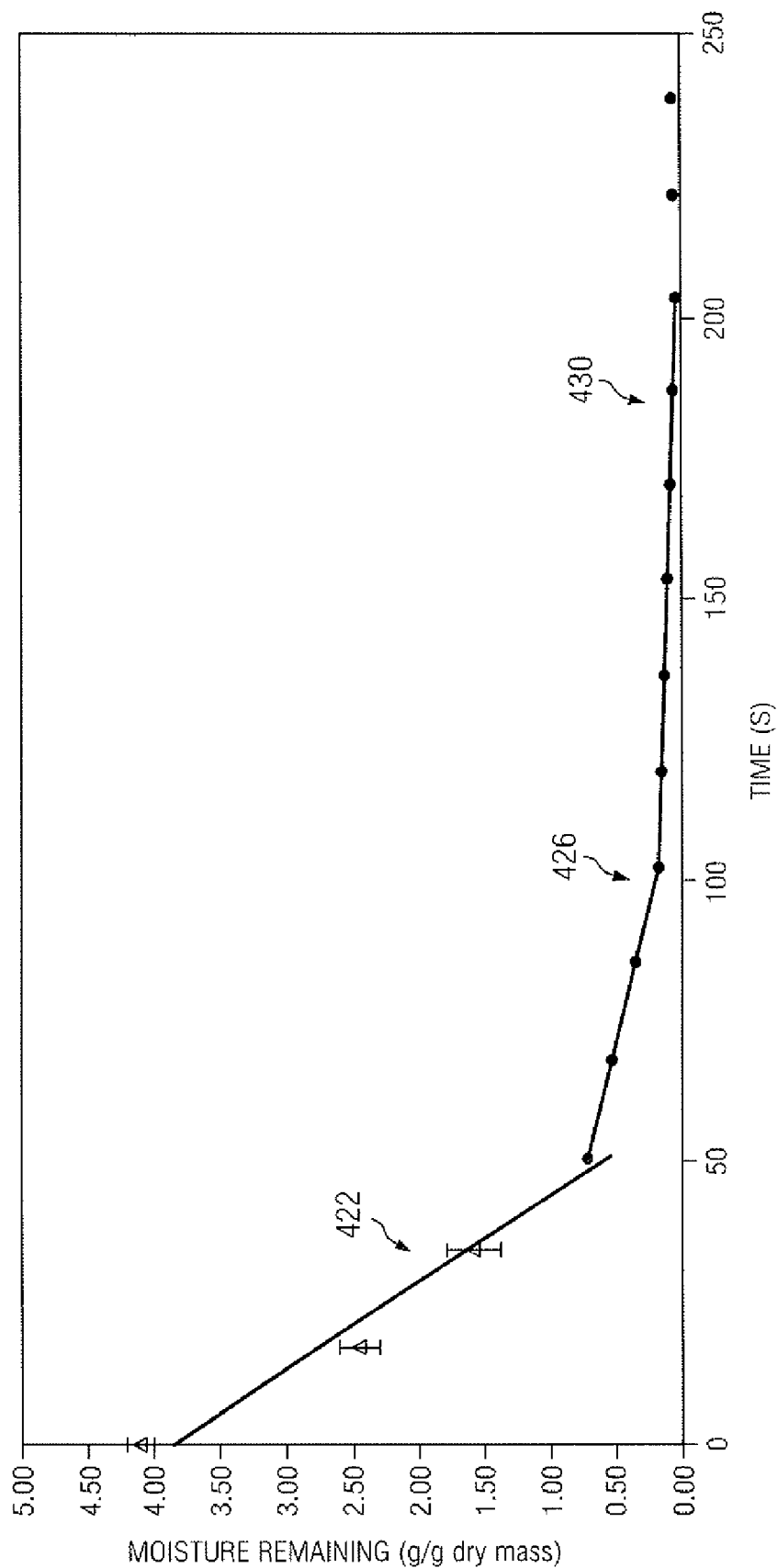
FIG. 4 is a graphical representation of the dehydration profile of a plurality of potato slices in accordance with one embodiment of the present invention.
Figure 6:
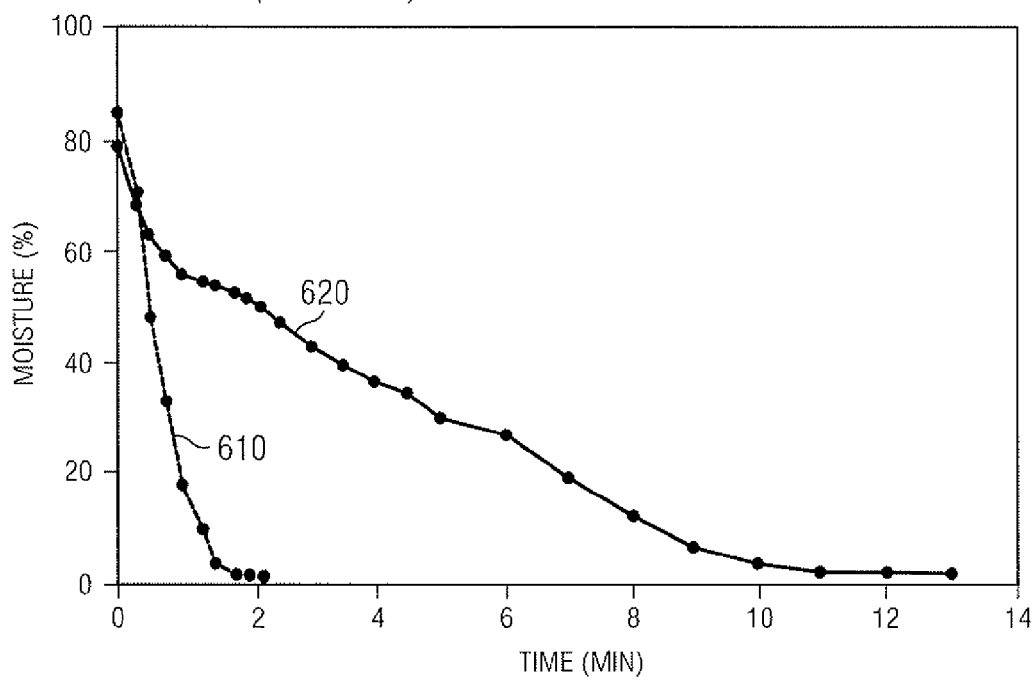
FIG. 6 depicts a prior art dehydration profiles of continuously fried potato slices and batch kettle fried potato slices.

FIG. 6 depicts a prior art dehydration profile of continuously fried potato crisps 610, and is taken from FIG. 4 of U.S. Pat. No. 5,643,626, assigned to the same assignee as the present invention. As shown, a potato slice having a moisture content of greater than about 80% is dehydrated to a moisture content of less than about 3% in about 2 minutes. Also shown by FIG. 6 is the dehydration profile of a batch kettle fried hard bite potato crisp having a slower dehydration profile 620 but still cooked in hot oil. Either of these dehydration profiles 610 620 can be simulated in a non-oil medium in accordance with embodiments of the present invention. By simulating these drying profiles, the present invention can also simulate the different finished crisp textures associated with these two dehydration profiles 610 620 or any profile in the spectrum of either atmospheric or vacuum frying. Not to be limited by theory, the inventors believe that by simulating the dehydration profile, the invention also effectively simulates the starch conversion that occurs and is largely responsible for the finished crisp texture. In this context 'starch conversion' refers to the temperature and moisture content of the majority of carbohydrates in the food slice as the majority of carbohydrates pass through each transition and the time the majority of carbohydrates spend in each transition phase (molten/liquid, rubbery/elastic or glass/crystalline). Carbohydrate melting and transition points have been determined and published elsewhere using simple capillary studies or techniques like Diffraction Scanning Calorimetry (DSC) to measure enthalpy changes.

The present invention can be used to mimic the dehydration profile of any fried food. Consequently, in one embodiment, the present invention provides a method for microwave cooking a food product to mimic the organoleptic characteristics of a fry-cooked product. An example of how the present invention can be utilized to provide a non-fried potato crisp having a dehydration profile that mimics the dehydration profile of a continuously fried potato crisp is provided below.

First, a dehydration profile corresponding to a fried food product is identified. For example, as previously indicated, FIG. 6 depicts the dehydration profile of continuously fried potato crisps 610 and the dehydration profile of batch kettle fried hard bite potato crisps 620. In one embodiment, the dehydration profile of a fried food can be determined by using a continuous flume fryer and removing samples at various distances related to certain times or a batch catering fryer where samples are 'fished' out of the oil at certain times and moisture content then determined. Next the food product is prepared for microwave cooking. For example, a potato can be prepared by blanching and optional pre-drying. The potato slices can then be cooked at a controlled power corresponding to the power required to reproduce, mimic, or create a substantially similar desired dehydration profile 610 620 as depicted in FIG. 6. This can be accomplished through trial and error by, for example, experimenting with a belted microwave under constant power settings, one can remove the microwaved food products at certain times and positions to determine the related moisture contents. The power level can be adjusted as required for the specific microwave system and food slice combination in use. Consequently, in accordance with one embodiment of the present invention, the controlled power corresponding to the power required to reproduce a dehydration profile of a fried food product comprises a first microwave power and a second microwave power. In one embodiment, the controlled power corresponds to transition points in the dehydration rate of the food slice which are believed to relate to starch transitions. The above example is provided for purposes of illustration and not limitation. The same method described above can be used to mimic the dehydration profile of other fried food products including, but not limited to tortilla crisps, corn crisps, French fries and hash browns. Since these products will have different initial moisture contents and may optionally have been pre-dried (e.g. in a toasting oven) the microwave drying profile should be adapted to suit, as described above.

In one embodiment, the explosive dehydration step 200 comprises simulating a dehydration profile to a moisture content of between about 2% and about 15% and preferably between about 4% and about 8% by weight in an amount of time that is similar to the time required for the comparison fried food product. The dehydration rates and starch conversion rates in the first two phases of the dehydration profile should be similar to and preferably match those of the comparison fried food product to achieve similar texture. For example, in one potato-based embodiment, the present invention comprises dehydrating the moisture content in a plurality of potato slices from greater than about 60% moisture by weight to less than about 20% moisture by weight in a non-oil medium in less than about 60 seconds. In one embodiment, the explosive dehydration step 200 further comprises reducing the moisture content in the slices from a first moisture content of between about 65% to about 80% by weight to less than about 15% by weight in a non-oil medium in less than about 120 seconds. In one embodiment, the explosive dehydration step further comprises reducing the moisture content to less than about 10% by weight or preferably less than about 2% by weight in the explosive dehydration step in less than about 180 seconds.

FIG. 2 is a graphical representation of the moisture content as depicted by the moisture dehydration curve 220 and temperature profile 270 of a potato slice undergoing an explosive dehydration step in a microwave in accordance with one embodiment of the present invention. As shown, prior to explosive dehydration, the potato slice comprises its native, raw state moisture content of just over about 80% moisture by total weight 201. Of course, in accordance with other embodiments of the present invention a blanched and/or par-dried potato slice can comprise a lower moisture content, as described above. Different potato varieties or other food materials (for example carrots) will have different raw moisture contents that may be different than described here. At this point, 201, the potato slice is wet, slippery, rubbery, and flexible. As the potato slice becomes more dehydrated, it becomes drier, less slippery, but remains rubbery and flexible 202. Onsets of blistering begin to appear throughout the slice, but the biggest concentration of the blistering occurs mainly at the edges as small, flat, irregular shapes. The onset of the blister formations can peel off implying potential steam explosions from within the slice. No puffing is observed at this point 202. In this approximate same time frame, the potato slice temperature reaches the boiling point temperature 272 and there is a relatively high rate of water vaporization 222. At the point depicted by numeral 203, the potato slice is drier than in 202 and there is an appearance of larger onsets of blistering throughout the slice. The potato slice is still flexible and some areas feel rubbery. The potato slice is not slippery at this point 203. The temperature of the potato slice remains flat 274 for a while after the potato slice approximately reaches the boiling point temperature of water at atmospheric pressure. There is also a slowing of the dehydration rate depicted by the slight flattening 224 of the moisture dehydration curve 220. Without being limited to theory, the inventors believe that the apparent flattening 224 of the dehydration curve coincides with the starch melting point 250 as determined in scientific literature using DSC methods, where many of the starch solids begin to melt. In the potato slice embodiment, the starch melting point 250 occurs when the slice has been dehydrated to about 50% moisture by weight and when the slice temperature is at about 100° C. For ease of interpretation, the period before this transition point has been classed as phase 1. At point 204, the drier potato slice continues to have the appearance of more blisters throughout the slice periphery. The slice at this point 204 is still rubbery and flexible. At point 205, the potato slice is in the second drying phase which occurs between the two transition points identified and where the starch is thought to be primarily rubber 226. The slice at point 205 is drier than the slice at 204 and there is the onset of a rough surface appearance and some degree of floppiness indicating the entire slice is not yet fully set. At point 206 the slice is hardened and appears set. Some brittleness has developed with a certain degree of give. The surface appearance is rough throughout.

At point 207, there is a flattening of the curve depicted by numeral 228. Again, without being limited to theory, the inventors believe such flattening 228 occurs as the starch enters the glass transition stage 260 and the starch solids begin to enter into a glassy state, labeled as phase 3. At point 208 the potato slice is drier and more brittle than at numeral 207 and the surface resembles a flat disk. At point 209, the potato slice is drier and more brittle. At point 210 the slice is drier and more brittle than at 209, and some puffed blisters are observed. At numerals 212 213 214 215 the potato slice is similar in appearance as in numeral 211. As the potato slice moisture content is low and the remaining moisture is less available for microwave energy to couple with in the final glassy state 230, the temperature of the food slice rises 280, which beneficially increases intensity of cooked potato flavor or imparts fried flavor notes into the food slice in the phase 3 drying stage if the slices are pre-oiled. For pre-oiled slices during phase 3 of the drying cycle, at low moisture contents, the microwave energy is thought to preferentially couple with the oil. This has been observed to generate beneficial fried flavor notes. Further, oil acts as a heat sink that helps prevent scorching and provides a broader opportunity for moisture control at the end of the drying process. Consequently, pre-oiled slices make the process more controllable and products develop flavor more characteristic of fried chips. Steam can also be used at the end of the drying cycle to help control drying to an equal rate between slices and avoid product scorching.

Figure 3:
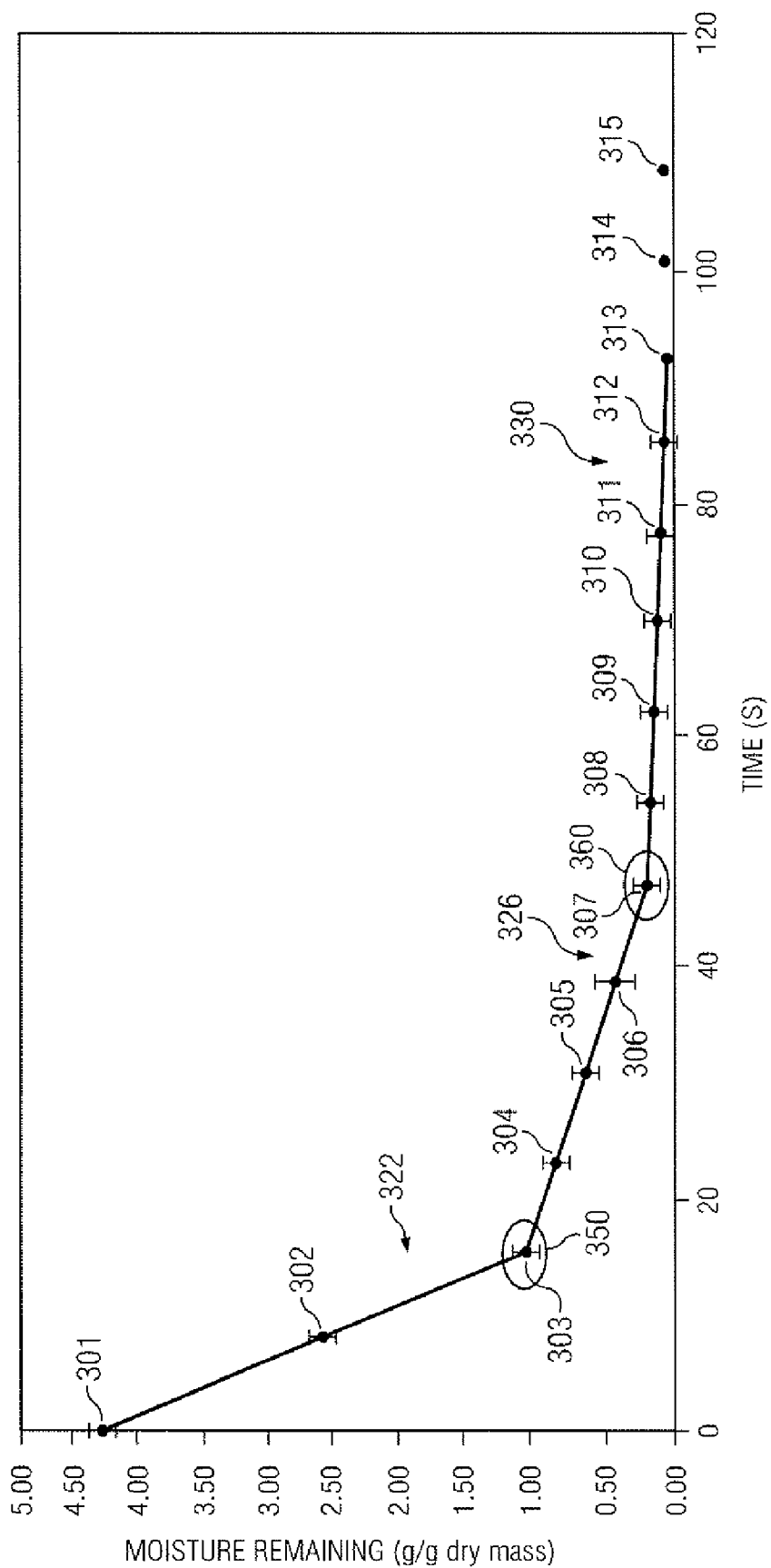
FIG. 3 is an alternative graphical representation of the dehydration profile depicted in FIG. 2.

FIG. 3 is an alternative graphical representation of the moisture content of the same potato slices depicted in FIG. 2. Instead of the moisture content being measured on a total weight basis, e.g. the water weight divided by the sum of the water weight and the dry solids, the moisture content is depicted as a ratio of the moisture remaining in the potato slice to the dry solids in the potato slice. The actual drying rates defined by grams of water removed per second as a ratio of the solids as depicted in FIG. 3 is a direct, primary and therefore more useful measure of the process conditions required to achieve target textures as opposed to a measure corresponding to the microwave power absorbed because the power absorbed by the product is specific to the cavity and product combination. The depiction as in FIG. 3 has been found to be a useful assessment tool to determine and better delineate the three different drying phases that appear to be marked by the starch transition points. Indeed, experiments have demonstrated that the drying rates and transition points can be defined accurately and are highly reproducible—especially when a homogenized food sample and/or controlled piece weight is used for determinations. Since these drying rates have been associated with different product textures, it is possible to precisely define the carbohydrate transition points and the relationship between dehydration profile and finished product attributes. It should be pointed out that the numerals 201-215 in FIG. 2 depict the same data, in different units, as the corresponding numerals 301-315 in FIG. 3.

As shown in FIG. 3, the drying curve has been divided into three distinct drying rates or phases. The first phase or first dehydration rate 322 starts when the food slice temperature reaches the boiling point and the moisture level begins to decrease. The slope of the line 322 depicts the first phase dehydration rate, which is 0.2 grams moisture per gram solid per second in the embodiment shown. Once the potato slice reaches its starch melting point range 350, the dehydration rate slows. Consequently, the second dehydration rate phase shown in FIG. 3 is 0.03 grams of moisture per gram of solid per second. The second phase dehydration rate is constant until the potato slice starch reaches the glass transition stage 360 and passes into phase 3. In the phase 3 dehydration stage 330, the temperature of the food slice increases to impart desired flavor notes. The exact temperature increase and profile will depend on the level of pre-applied oil as well as other drying energy factors.

A rise in the product temperature represents a change in absorption of the microwave energy away from water during the latter drying stage. Product drying can be stopped just prior to temperatures rising rapidly toward the end of the drying cycle when microwave energy heats organic matter of the substrate directly rather than water. The exact temperature profile will be in part dependent on product formulation and can be determined by trial and error and then set as a process control parameter. Consequently, in one embodiment, the potato slice is removed from the heating stage 330 when the potato slice reaches a certain temperature. By removing the product before a significant temperature rise occurs, the development of acrylamide can be minimized. In one embodiment, the food slices are removed from the microwave at some time after the slices reach a temperature of about 110° C. and preferably before reaching about 140° C. and optimally before reaching about 120° C. to minimize acrylamide formation. In one embodiment, the heating stage 330 occurs under vacuum to further minimize acrylamide formation. In one embodiment, the explosive dehydration step 200 occurs in a vacuum microwave. Such an embodiment advantageously reduces the temperature of the food slices during dehydration resulting in lowered levels of acrylamide. Those skilled in the art will recognize that by operating under vacuum, the temperature and moisture parameters of the starch conversion are modified and this can be used to further manipulate finished product texture. Therefore, in one embodiment, all or a portion of the microwave dehydration occurs under a vacuum where the vacuum level is selected according the finished product texture desired. In one embodiment, the microwave comprises a micro vacuum of between about 20 to about 80 torr where the boiling point of water is less than about 46° C. or a high vacuum of between about 150 to about 250 torr where moisture boiling point is between about 60° C. and about 70° C. In one embodiment, the vacuum may be released or partially released towards the end of the drying cycle to encourage flavor development in the crisp. Alternatively, a low vacuum of about 500 to about 700 torr where moisture boiling point is between about 90° C. and about 98° C. may be applied to slightly lower product temperatures while minimizing the risk of ionizing a rarefied atmosphere containing microwave energy. In one embodiment the vacuum level is increased towards the end of the drying cycle to avoid exposing heat sensitive food materials to excessive temperature when moisture contents are low and therefore to minimize acrylamide formation. Of course the requisite vacuum level can depend on one or more factors including the food substrate material, desired degree of puffing, microwave power, food substrate shape, etc. Consequently, the vacuum can range from 0 to about 760 torr.

It should be noted that the specific dehydration rates depicted for three dehydration phases shown in FIG. 3 merely depict one embodiment of the present invention. The actual drying slopes can be controlled to simulate frying based upon the power provided by a microwave, the design of the applicator and the composition of the food slice.

Table 1 below depicts the dehydration rates for the three phases for a single cavity (applicator), continuous belt, multimode microwave run at two different power levels. Such information is provided for purposes of illustration and not limitation. The claims scope of the present invention applies to any microwave system where energy is absorbed by a food slice in the microwave field and is not limited by design specifics such as number, location, design or orientation of waveguide inputs; microwave frequency; number of modes; shape of cavity (applicator) etc.

The microwave heating chamber used to generate the information depicted in Table 1 contained on average 39 potato slices (Saturna), dry mass equivalent of about 35 grams, at any instant. At Pf=6 ("Medium" power in this example), to achieve drying rates of about 0.2, 0.03 and 0.004 grams moisture per gram dry mass per second over the drying times shown in FIG. 3 required absorbed microwave powers of about 2.6, about 0.8, and about 0.2 kW respectively (3.5 kW in total). Therefore, the absorbed power distribution for Phase 1, Phase 2 and Phase 3, is about 73%, about 23% and about 4% of the total absorbed power respectively. Similarly at Pf=3 ("Low" power in this example) the drying rates of about 0.065, about 0.01 and about 0.001 shown in FIG. 4 (discussed below) required absorbed microwave powers of about 1.3, about 0.2, and about 0.04 kW (about 84%, about 13% and about 4%) respectively (1.5 kW in total). These numbers provide a guide, to one skilled in the art, to the power distribution required in the microwave drying process (explosive drying) in this worked example. However, these values are specific to the pilot process (microwave cavity and power source) in use and should be set to ensure the absorbed power delivers the desired drying rate quoted in grams moisture per gram dry mass per sec for which ever cavity is in use.

Since the actual energy absorbed is a function of cavity design and product, the efficiency of a specific microwave system must be known to set the relevant forward power. In this case, assuming a coupling efficiency of about 70%, the Pf=6 "Medium" power setting corresponds to power available in the cavity of 5 kW, and the Pf=3 "Low" power setting corresponds to power available in the cavity of 2 kW (the excess energy being absorbed by the cavity walls and internal support structures). In both cases, reflected power was around 1 kW, corresponding to the actual forward power setting used in the experiments of 6 kW and 3 kW for the Pf=6 and Pf=3 power runs respectively.

TABLE 1

| Drying rates (grams moisture to grams dry mass per second) Potato Slice Dehydration Rate Examples to Match Continuous Frying of Regular PC | | |
|---|---|---|
| | Pf = 6 (FIG. 3) | Pf = 3 (FIG. 4) |
| Phase 1 | 0.2 | 0.065 |
| Phase 2 | 0.03 | 0.01 |
| Phase 3 | 0.004 | 0.001 |

While not being limited by theory, the inventors recognize that phase 1 and phase 2 appear to be responsible for mimicking the texture generated by frying using the disclosed non-oil drying method. Phase 1 corresponds to the evaporation of a large amount of water. In phase 1, drying rates are highest and the inventors have observed these drying rates are often similar between "different" food slices (e.g. raw slices and dough slices of similar starting moistures) for a given set of microwave conditions. Phase 2 relates to a significant starch transition, which is traditionally slow in kettle fryers and quick in continuous fryers and the inventors have observed that this rate is often dependant on the food slice (e.g. the rate will vary between a raw slice and dough slice for a given set of microwave conditions). Because the starch, and therefore texture has set, phase 3 influences the finished crisp flavor and color and also facilitates equilibration of the moisture distribution within and between food slices.

With the knowledge that drying profiles can be divided into three distinct phases and an understanding that these phases influence the finished product in different ways, a drying profile can be determined that manipulates the product texture and flavor in a similar way to changing the profile of a fryer today from continuous to kettle. For example, to achieve a kettle like texture, energy input is reduced in phase 2 to simulate the slower starch melting that occurs in kettle crisp fryers. Effectively, a microwave can be tuned to deliver the same effects as a fryer—using energy transfer to replicate conductive heat transfer without the use of oil.

In one embodiment, the continuous microwave cavity is divided into multiple continuous cavities through a series of chokes or baffles. By selecting appropriate positions for each choke device, the microwave energy input can be independently controlled at each point along the drying curve. This enables the user to specify and control to different drying rates during each phase, or if desired within a phase. Therefore, the drying rate of phase 2 could be reduced as above for 'kettle' texture or could, for example, be increased to match that of phase 1 in order to reduce the overall drying time while the drying rate in phase 3 may, for example, be decreased in order to confer a broader control window over the moisture and temperature exit conditions.

An alternative embodiment uses batch microwave drying in place of continuous microwave drying. Those skilled in the art will be familiar with domestic microwaves that operate on a batch basis with either a continuous or pulsed power input. By way of reference, a typical domestic oven has been measured to have a phase 1 drying rate 10 times slower than the example given for Pf=6 above and a total drying time, approximately 4 times as long. As outlined above, this method will deliver a harder product texture and will create more challenging control conditions to remove the product at an equilibrated, consistent moisture content at the end of the drying cycle since the power input remains constant even when moisture is low towards the end of the drying cycle.

Therefore, in one embodiment, a batch microwave is used with the power input adjusted over the time of the drying cycle to simulate the energy profile of a continuous drying system. By way of example but not limitation, for the Pf=6 example given above, the power input (which is determined by product load and cavity design) would be reduced at a time that coincides with the start of each phase so that phase 1 received about 73%, phase 2 received about 23% and phase 3 received about 4% of total energy required for drying. The power profile can be tailored to deliver the desired product and most economic drying conditions for the food slice taking into account that hot air addition and vapor extraction may also be used to assist the drying process. In one embodiment, the principle of controlling power input over time for batch drying is applied when operating the microwave chamber under vacuum as described above.

FIG. 4 is another graphical representation of the dehydration rate of a plurality of potato slices in accordance with one embodiment of the present invention. The microwave power energy input per kg that produced the data for FIG. 4 was lower than the power used to produce the data in FIG. 3. As shown in FIG. 4, there are three distinct drying phases that have a high linear correlation. The first phase dehydration rate 422 is about 0.065 grams moisture per grain solid per second. The second phase dehydration rate 426 is about 0.01 grams moisture per gram solid per second and the third phase 430 comprises a dehydration rate of about 0.001 grams water per gram solid per second.

Figure 5:
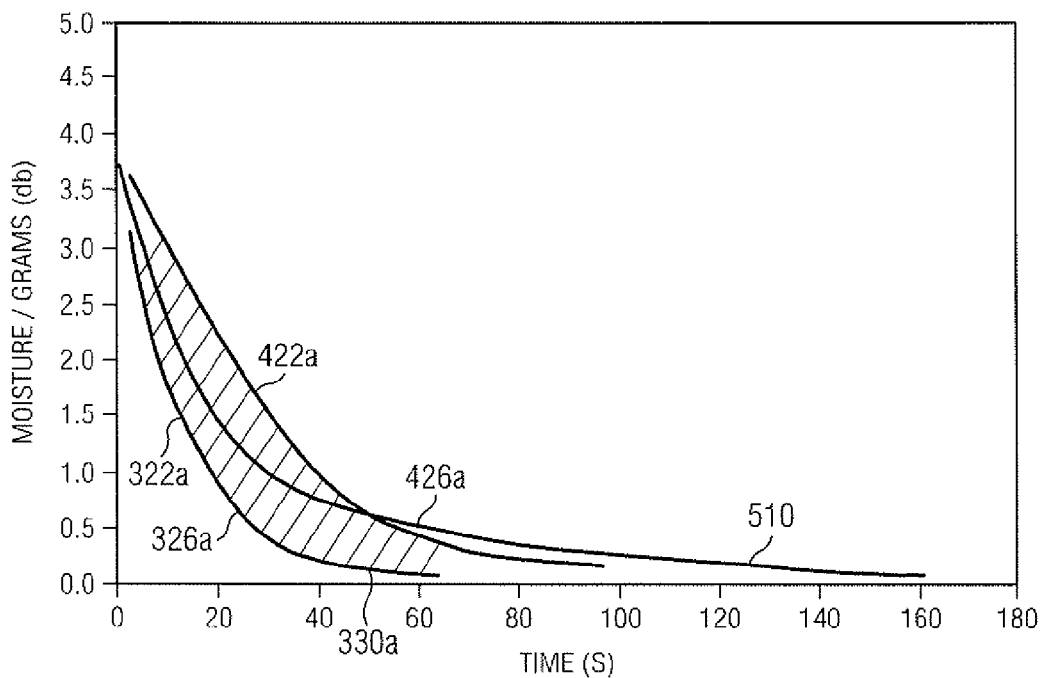
FIG. 5 is an approximate comparative graphical representation of the data depicted in FIG. 3 and FIG. 4.

FIG. 5 is an approximate, comparative graphical representation of the data depicted in FIG. 3 and FIG. 4. The lower line 322a 326a 330a and upper line 422a 426a define the drying rate window in which the target texture was reproduced for the potato crisp product being studied. Because the lines depicting the dehydration rates in FIG. 3 and FIG. 4 have been curve fit, the upper and lower lines are approximate. As a result, the numerals have the letter "a" associated to indicate the slight variation.

As shown, the first dehydration rate 322a, second dehydration rate 326a and third dehydration rate 330a from a microwave oven operating at a power rate required to achieve the depicted dehydration rates 322a 326a form a lower boundary. Similarly, the first dehydration rate 422a, and second dehydration rate 426a from a microwave oven operating at a power rate to achieve the depicted dehydration rates 422a 426a determine an upper boundary. It is the shaded area between these two boundaries that corresponds to a region that mimics the dehydration profile 510 of a continuous deep-fried thinly sliced, flat cut potato crisp. Consequently, in accordance with one embodiment of the present invention, a food slice dehydration profile that delivers texture and organoleptic properties similar to its fried counterpart but occurring in a non-oil medium, lies in the shaded region.

In summary, the study of microwave drying of food slices has revealed three different drying phases that appear to be marked by the starch transition point, the melting point and the glass point. In phase 1 the drying rates are highest prior to the starch melting and 'unbound' water is substantially removed. The faster this moisture is removed the more porous the slice surface is expected to be and the fewer the final number of blisters. In phase 2 the drying rates are intermediate post-starch melting and the rate at which the food slice transitions through this phase influences how the texture is set in the final snack. In phase 3 the drying rates are lowest post starch glass transition. In phase 3, the flavor and color is developed and moisture is equilibrated. Cooked potato and fried flavor notes are imparted, particularly when oil is present on the food slice and the oil and food slice are heated through microwave power coupling preferentially with the oil at lower moisture contents and some added steam heating present during this final moisture evaporation stage. This results in a relatively higher exit temperature but more controllable product and process conditions at the end of the microwave drying step.

The phase 1 and phase 2 drying rates appear to be proportionally related. Further, phase 1 appears to be product independent while phase two appears to be product dependant. In other words, whether the product or food slice is a dough-based slice or a sliced raw food, such as a potato, phase 1, or the first drying slope, will yield somewhat similar results for sliced and dough-based foods subject to the same evaporative energy. Phase 2, or the second drying slope, is more product dependent and the dehydration rate will vary between sliced food and dough-based foods. By way of example, for a raw potato slice, the phase 1 to phase 2 slope dehydration ratio is about 6.5:1. For a potato dough slice, the phase 1 to phase 2 dehydration ratio is about 3:1 in a single continuous cavity.

One important benefit of the present invention is that the rate of microwave drying can influence the product texture. Consequently, with knowledge of the carbohydrate transition points, which is easily determined using a belt-driven microwave cavity, a dehydration profile can be determined that manipulates the product texture as desired. Acceptable snack products can be made in primary or explosive drying times from about 30 seconds to over 12 minutes. Longer drying times (specifically a longer time in phase 1 and 2) create slightly harder and glassier textures similar to batch kettle fried hard bite potato crisps. For example, to achieve a kettle-like texture, energy input can be reduced in phase 2 to simulate the slower starch melting phase that occurs in the kettle crisp fryers today. Faster drying times (specifically a shorter time in phase 1 and 2) create more light and crisp textures similar to the fried snack foods made in continuous fryers of today. Effectively, a microwave can be tuned to deliver the same effects as a fryer and can thereby replicate heat transfer without the use of oil.

A belted or rotary microwave can be used for the explosive dehydration step 200. A belted microwave known from frozen meat and fish applications and available commercially from Ferrite, Inc. of Nashua, N.H., USA can be used. Belted microwaves either as single or multiple cavities are most suited to food slices that are sheeted, stamped or otherwise deposited in an orderly manner onto a moving belt. Rotary microwaves are most suited to food slices presented in a random manner to the explosive drying step 200 or where product sticking is not a concern. Rotary microwaves are available in other industries such as the ceramics industry, as illustrated by U.S. Pat. No. 6,104,015 and for "microwave absorbent materials" as illustrated by U.S. Pat. No. 5,902,510 and can be constructed for use under vacuum as illustrated by U.S. Pat. No. 6,092,301 for tanning. Rotary microwaves are not promoted for use in food products but can be used in this instance. One advantage of using a rotary microwave is that food slices can fold as the slices dehydrate and transition from the rubbery state into the glassy state. As a result, the dehydrated slices have random folds thereby mimicking the appearance of traditionally fried snacks. An important feature of rotary microwave drying is that it avoids the need to partially separate or singulate the food slices prior to explosive drying which is a complicated operation and normally required to ensure slices do not stick together during drying on a belt. Therefore, a further advantage to a rotary microwave oven is that the food slices can be explosively dehydrated in a relatively dense deep bed configuration whilst being continuously agitated. The tumbling action maintains individual slice separation and avoids slices sticking together without requiring a large, uneconomic footprint that would be needed to keep the slices separated in a monolayered or partially mono-layered belt drying operation.

In one embodiment, a rotary microwave that is suitable for snack food applications is constructed in either batch or continuous form. In its simplest form, a rotating drum that will transport the food slices during drying is enclosed in an external cavity. The external cavity can be built to any geometry including, but not limited to square, triangular, pentagonal, hexagonal or parallelogram. A circular cavity confers the opportunity to minimize the volume of the system by accommodating a concentric product transport drum or acting as the rotating product transport drum itself. Food slices are fed into the cavity through a microwave choke equipped with a transport belt or vibrating conveyor and can be removed by similar means or by free fall through a suitable choke.

In alternative embodiments, other novel microwave designs may be utilized including, but not limited to, cavities that transport slices on helical conveyors, multi-pass conveyors, vertical trays, or accept free falling slices under gravity with or without counter air flows.

In one embodiment, steam is added near the end of the drying cycle when the moisture content is low to assist in avoiding product scorching. Further, one or more additional mediums selected from hot air, steam, superheated steam, radio frequency, and infrared radiation can be used to assist the explosive dehydration in the microwave.

Referring back to FIG. 1, after the explosive dehydration step 200, the slices can be finish dried 300 to a moisture content of less than about 3% by weight of potato solids in the finished chip. A hot air dryer having a belt configuration operating at about 80° C. to about 140° C. or other suitable methods can be used alone or in combination. Other suitable finish drying 300 methods include one or more drying methods selected from hot air, infrared, radio frequency, and microwave. The slices can optionally be salted or seasoned 400 by methods well known in the art. An oil spray step can be used after the finish dry step 300 either before or in conjunction with the seasoning step 400 to tailor the final oil content and assist with seasoning adhesion.

The above unit operation examples are provided by way of illustration and not by way of limitation. Further, those skilled in the art will appreciate that many of the processes discussed with the potato slice embodiment above can be used with other food slices, including, but not limited to, beets, beans, carrots, bananas, apples, strawberries, lentils, wheat, rice, parsnips, Jerusalem artichokes, potatoes, masa, and corn. Starchy tubers are especially preferred. Further, those skilled in the art will recognize that if processing steps are applied to other raw foods besides potatoes, such foods may require processing times and temperatures different than those disclosed. However, such embodiments are intended to be covered by the claims scope of the present invention.

Doughs, in accordance with the present invention, can comprise entirely fresh raw materials or a mixture of fresh and dried raw materials such as native or modified starches. Additional ingredients including, but not limited to, seasoning, oil, nuts, seeds, pulses, and other inclusions such as fresh or dried herbs and spices may also be added to a dough. One advantage of the invention is that relatively fragile doughs that may not be sufficiently cohesive for frying can be processed and dried using the continuous belt microwave or batch embodiments of this invention.

There are several advantages provided by the present invention when used with dough based food slices. First, the process allows the nutritional profile of the product to be controlled. For example, oil is added in controlled amounts either before and/or after the primary drying step. One advantage of adding oil before the explosive dehydration is that it will be heated for a short period toward the end of the explosive drying and this develops fried-flavor characteristics. Another advantage provided by the present invention is the processing temperatures. Because the processing temperatures are relatively low throughout the food slice (e.g. can be maintained at about 100° C. even on the outer skin) when compared to conventional hot oil frying, and the processing times are relatively short, e.g. less than about 60 seconds is achievable even for high moisture doughs, less of the inherent nutrition is expected to be destroyed during the drying process and natural flavor characteristics of the substrate or added ingredients derived from nuts, seeds, pulses, herbs, spices etc. are retained. Similarly, nutritionally desirable vitamins, essential fatty acids or phytonutrients inherent in the added ingredients or directly added for fortification are expected to be retained. Further, the low temperature and short drying time benefits the use of natural ingredients if added as flavorings or seasonings in dough-based embodiments. This drying method and profile also helps to ensure that any natural ingredients added can deliver an authentic, vibrant flavor to a finished product because the natural ingredients added for reasons of flavor, texture or fortification, can be expected to retain a significant portion of their inherent nutritional and organoleptic value without losing desirable aroma, flavor, color or phytonutrient compounds. Consequently, the present invention provides a way to provide a balanced nutritional profile using real food ingredients, such as nuts, seeds, herbs, and spices or cheese. Nuts that can be used include, but are not limited to almonds, peanuts, walnuts, pecans, and brazils. Seeds that can be used include, but are not limited to pumpkin, sunflower, sesame, poppy, and squash. Herbs and spices that can be used include but are not limited to basil, bay leaves, coriander, cumin, garlic, oregano, paprika, parsley, and pepper, just to name a few. Natural oil extracts can also be used either prior to or post primary drying.

Advantageously, because the real food ingredients can be added after any blanching step, and because of the relatively lower temperatures and short dwell time during dehydration, the flavor profiles are more pronounced than prior art snacks that are cooked in high temperature ovens or fryers. Further, because there is no oil or water medium, the nutrient content and flavor profiles do not leach out. Consequently, unlike the prior art, the present invention provides a way to formulate natural flavor profiles without the use of artificial ingredients.

While the invention has been particularly shown and described with reference to a preferred embodiment, it will be understood by those skilled in the art that various changes and form of detail may be made therein without departing from the spirit and scope of the invention.

What is claimed is:

1. A method for replicating a drying profile of a fried food product when cooking said same food product in a non-oil medium, said method comprising the steps of:
    a) determining the moisture level in the fried food product at a plurality of points in time during the time that the fried food product is fried;
    b) plotting the determined values of step a) as moisture remaining per mass of dry food product versus time;
    c) using said plotted data of step b) to identify three cooking phases relating to three linear segments of said plotted data, said three cooking phases consisting of a first phase, a second phase, and a third phase, wherein further each phase consists of a determined average dehydration rate and duration; and
    d) determining power inputs required from non-oil cooking to maintain the determined dehydration rates for at least the first phase and second phase of step c) for cooking said same food product in a non-oil medium; and
    e) applying the determined power inputs to a food product for the time period identified in step c) for the respective cooking phases, thereby mimicking the drying profile of the fried food product.

2. The method of claim 1 wherein the power inputs of step e) during the first and second cooking phases comprises microwave energy.

3. The method of claim 1 wherein the dehydration rate of the first phase identified in step c) is between about 0.065 grams of moisture per gram of solid per second and about 0.2 grams of moisture per gram of solid per second.

4. The method of claim 1 wherein the dehydration rate of the second phase identified in step c) is between about 0.01 grams of moisture per gram of solid per second and about 0.03 grams of moisture per gram of solid per second.

5. The method of claim 1 wherein each phase identified in step c) is defined at an end point by at least one starch transition point.

6. The method of claim 1 wherein the fried food product of step a) consists of slices of a starting food material selected from the group consisting of potato, sweet potato, yam, beet, and carrot.

7. The method of claim 1 wherein the fried food product comprises dough prior to frying.

8. The method of claim 1 wherein said food product is subjected to a blanching step prior to step e).

9. The method of claim 8 wherein said blanching step comprises a wet blanch.

10. The method of claim 8 wherein said blanching step comprises a dry blanch.

11. The method of claim 8 wherein said blanching step comprises an oil blanch.

12. The method of claim 1 wherein oil is added to the food product prior to step e).

* * * * *